United States Patent Office 2,865,960
Patented Dec. 23, 1958

2,865,960

PROCESS FOR THE REMOVAL OF IMPURITIES FROM WATER-SOLUBLE ACRYLAMIDES

Newton H. Shearer, Jr. and Harry W. Coover, Jr., Kingsport, Tenn., assignors to Eastman Kodak Company, Rochester, N. Y., a corporation of New Jersey No Drawing. Application February 28, 1956
Serial No. 568,193

4 Claims. (Cl. 260—561)

This invention relates to a method for separating impurities from water-soluble acrylamides having the general formula:

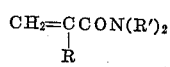

where R is methyl or hydrogen and R' is hydrogen or alkyl sufficiently low in the homologous series to render the acrylamide water-soluble. Some examples of these water-soluble acrylamides are: acrylamide, methacrylamide, N-methylmethacrylamide, N,N-dimethylacrylamide and N-isopropylacrylamide.

In the chemical art ion exchange resins are used extensively for purification and softening. For these purposes there are available a great variety of ion exchange resins which are themselves insoluble or which have the property of exchanging ions in the resin with those in the substances to be purified. The ions in the substances to be purified are exchanged with the ions in the insoluble resin and become part of that insoluble resin, remaining in the ion exchange reactor or container along with the resin. Both cation and anion exchange resins may be used in this manner.

U. S. Patent 2,580,325 to Scott discloses purification of emulsions of insoluble polyvinylidene polymers using ion exchange resins. In the preparation of emulsion polymers of such materials as vinylidene chloride, there is generally used a surface active agent and a water-soluble polymerization catalyst. The isolation of these emulsion polymers results in the surface active agent and catalyst residues being incorporated into the polymer. As pointed out in the Scott patent, the presence of surface active agent and catalyst residues in polymeric materials results in certain undesirable properties; for example, poor electrical properties. The process of the Scott patent, is specifically concerned with the removal of such additives as surface active agents and residual catalyst residues, which materials were used in obtaining the polymer. Scott was not concerned with the use of ion exchange resins for the purification of the monomers. Furthermore, monomers disclosed in the Scott patent cannot be purified by the use of ion exchange resins since they are water-insoluble.

The process of our invention is specifically concerned with the purification of water solutions of monomeric acrylamides and methacrylamides to yield a product suitable for polymerization. We are not concerned with the purification of the resultant polymers to remove any catalyst residues and surface active agents, where such surface active agents are used in the polymerization.

Soluble monomeric acrylamides which have been purified using our method can then be polymerized to polymers having superior properties. Such amides can also be purified, in the alternative, by prior art processes described in the literature such as by recrystallization and distillation. However, we have found in the course of our work that monomeric amides prepared by these prior art processes yield a product which, when polymerized, gives polymers having certain inferior properties such as low molecular weight, poor solubility characteristics, and the like. It was not until the present invention that we obtained a product which could be polymerized to give a polymer having the desired properties. In the preparation by the usual methods of the acrylamides to which the invention pertains, the crude product contains impurities of acidic and basic character. If the acrylamide is insoluble in water and soluble in an organic solvent, these impurities are easily removed by the usual extraction technique of dissolving the amide in the organic solvent and washing with small amounts of aqueous acid and base. This technique is not feasible for the acrylamides and N-methacrylamides which are quite soluble in water. With these amides the losses during extraction so materially reduce the yield of the pure amide as to make the procedure impractical. Redistillation of these crude amides is also ineffective in completely removing the impurities.

An object of this invention is to provide a convenient method of removing impurities from water-soluble acrylamides to obtain these acrylamides in a high state of purity and in good yield. Another object of this invention is to provide pure monomeric acrylamides of the water-soluble type which can be polymerized to obtain polymers having superior properties. Another object of this invention is the removal of cationic and anionic impurities from monomeric acrylamides by the use of ion exchange resins. Another object of this invention is the purification of water soluble monomeric acrylamides by a process which removes impurities not removed by distillation. A further object of this invention is to provide a polymer having superior properties such as improved solubility in dilute aqueous acid and color fastness in dyed fibers produced from the polymer, which properties result from the high purification of the monomer by ion exchange resins. Another object resides in a polymerization process involving purification of the monomer solution by ion exchange prior to the actual polymerization step.

The acrylamides and methacrylamides are valuable intermediates for the preparation of homopolymers, copolymers and graft polymers. However, the presence of impurities (for example, amines and organic acids) even in small amounts, gives polymers having inferior properties. For example, the presence of as little as 0.05 milliequivalent of acidic and basic impurities in N-methylmethacrylamide monomer causes an induction period when the monomer is copolymerized or graft polymerized with acrylonitrile. Also, the solubility of the polymeric product from such impure monomers in dilute aqueous acid is considerably reduced and dyed fibers prepared from the polymer fade much more readily. Therefore, it is quite important to completely remove these impurities.

In accordance with this invention, the crude acrylamide in aqueous solution is treated with a cation exchange resin and with an anion exchange resin. Either the column or batch technique may be used. The cation exchanger is used in the hydrogen form and the anion exchanger is used in the hydroxyl form as generated by well known procedures recommended by the manufacturers. It is convenient to employ a 25–50 percent solution of the amide in water.

For acrylamides which are liquids at room temperature and completely miscible with water, the concentration employed in the purification step may range all the way from 100 percent acrylamide to very dilute aqueous solutions. For the acrylamides which are solids at room temperature, the upper limit in concentration is the solubility of the acrylamides in water.

The purification process is conveniently carried out at room temperature. Somewhat higher or lower temperatures may be used within the temperature limits set by the manufacturer of the ion exchange resin. Usually the upper limits recommended are about 90° C. for the cation exchanger and about 55° C. for the anion exchanger.

The cation exchange resins which may be used in the process of this invention are water-insoluble solids containing acidic groups or radicals such as carboxylic acid or sulfonic acid groups or radicals. Cation exchange resins are prepared by the following means, for example: the sulfonation of a phenolformaldehyde resin; the sulfonation of a polystyrene; the sulfonation of a polystyrene-divinylbenzene copolymer; the copolymerization of methacrylic acid with divinylbenzene; and the preparation of a synthetic zeolite. The synthetic zeolites are a group of hydrated aluminum and calcium or sodium silicates of the general type $Na_2O \cdot 2Al_2O_3 \cdot 5SiO_2$ and $CaO \cdot 2Al_2O_3 \cdot 5SiO_2$.

The anion exchange resins which may be used in the process of this invention are generally water-insoluble solids containing basic nitrogen groups of a primary, secondary, tertiary or quaternary type. They are prepared by the following means, for example: the chloromethylation of a styrene-divinylbenzene copolymer followed by reaction of this product with a tertiary amine, a secondary amine, a primary amine or ammonia; the condensation of phenylenediamine with formaldehyde; and the condensation of phenylenediamine, polyethylene imine and formaldehyde.

As the cation exchanger, either a strongly acidic resin such as Amberilte IR-120 or an acidic resin of moderate strength such as Amberlite IRC-50 can be used. As the anion exchanger, a strongly basic resin such as Amberlite IRA-400 is preferred. The resulting aqueous solution may be used as such for polymerization or it may be evaporated under reduced pressure to any desired concentration.

Amberlite IR-120 is the trade name of a polymer in which the "linear" polystyrene chains are cross-linked by divinylbenzene. Nuclear sulphonic acid type cation exchangers are formed by treating the hydrocarbon polymers with concentrated sulfuric acid or by treating with chlorosulphonic acid.

Amberlite IRA-400 is a trade designation for a strong base amine exchange polymer formed by treating a polystyrene-divinylbenzene copolymer with chloromethyl ether in the presence of a swelling agent so as to introduce methylene chloride groups. This product is treated with a tertiary amine to produce the quaternary ammonium salt or strong base type anion exchanger.

Amberlite IRC-50 is the trade designation of a weak acid cation exchange resin which may be formed by cross-linking methacrylic acid with divinylbenzene in the presence of benzoyl peroxide.

The invention, however, is not limited to these particular resins, but these particular resins are mentioned as illustrative of their type. It will be recognized by those skilled in the art that other cation and anion exchange resins such as those indicated above are operable and within the scope of this invention.

The invention is further illustrated by the following examples, which are given in an illustrative and not a limiting sense:

Example 1

Sixty grams of Rohm and Haas Amberlite IR-120 were regenerated using sulfuric acid as recommended by the manufacturer. Two-hundred grams of crude N-methylmethacrylamide were dissolved in 200 g. demineralized water. This solution was allowed to run through the IR-120 in a period of 25 minutes. Then 25 ml. of demineralized water were run through the column at the same rate, and collected in the same receiver. The resulting solution tested acidic to litmus. It was then allowed to run through sixty grams of regenerated Amberlite IRA-400 in a period of about 40 minutes, followed by 25 ml. of demineralized water for washing. The resulting solution tested slightly basic to litmus. A second run through the Amberlite IR-120 column followed by 25 ml. of demineralized water gave a solution weighing 455.4 grams, which tested neutral to litmus and was found upon titration to contain no detectable quantities of either acid or base. Analysis of the solution for nitrogen showed that it contained 38.7 percent by weight N-methylmethacrylamide. The yield was thus 88 percent.

Example 2

Thirty grams of crude N-methylmethacrylamide containing 1.47 milliequivalents of base per gram and 1.42 milliequivalents of acid per gram were stirred for 2.5 hours at room temperature with 10 g. of regenerated Amberlite IR-120. At the end of this period the mixture tested acidic to litmus. The Amberlite IR-120 was removed by filtration and to the filtrate was added 10 g. of regenerated Amberlite IRA-400. This mixture was stirred for 6 hours, whereupon the mixture became neutral to litmus. On continued stirring, the mixture remained neutral. Benzene, 35 cc. was added to the filtrate after removal of the Amberlite IRA-400 by filtration. This benzene solution was distilled to obtain the purified N-methylmethacrylamide, B. P. 76–78° C./1.5 mm., $n_D^{20}$—1.4738. The distillate was neutral to litmus test and upon titration was found to contain no detectable quantities of acid or base.

Example 3

A 35 percent aqueous solution of crude N,N-dimethylacrylamide was treated according to the procedure of Example 1 to give a pure product free of both acid and base.

Example 4

A 45 percent aqueous solution of crude acrylamide was treated according to the procedure of Example 1. The product contained neither acid nor base.

Example 5

A 25 percent aqueous solution of crude methacrylamide was treated according to the procedure of Example 1. The product polymerized satisfactorily and contained neither acid nor base.

Example 6

Dry ammonia gas is bubbled through a cooled solution of 100 g. (1.11 moles) of acrylyl chloride dissolved in one liter of dry benzene until the solution no longer has the odor of acid chloride. The solution was heated to boiling and filtered. The filter cake was extracted three times with one liter portions of hot benzene. Acrylamide separated from the combined filtrates on cooling. The acrylamide was dissolved in 100 ml. of demineralized water and was passed through a column containing 15 g. of Rohm and Haas Amberlite IR-120 resin in the acidic form during 25 minutes. The column was rinsed with 10 ml. demineralized water, and this was added to the amide solution. The solution of acrylamide at this point was acidic in reaction to litmus and was passed over 15 g. of Rohm and Haas Amberlite IRA-400 resin in the basic form during a period of 40 minutes. The column was washed with 10 ml. of demineralized water. The combined water solutions weighed 182 g. and were neutral in reaction to litmus. A titration indicated that essentially no acid or base was present. Analysis of the solution showed that it contained 34.1% acrylamide by weight.

Example 7

A solution of 181 parts acrylyl chloride in 1,000 parts of benzene was cooled to 10° C. and 127 parts of gaseous methylamine was vaporized into the mixture during 2 hours, the solution being thoroughly agitated during the addition and the temperature being maintained at 10–14° C. After the addition of the methylamine was complete, the reaction mixture was filtered and the filter cake was washed twice with 100 part portions of benzene. The benzene solutions were combined and the benzene was removed under reduced pressure and the N-methylacrylamide was distilled at 1–2 mm. after the addition of 1 gram hydroquinone. The distilled N-methylacrylamide was dissolved in 200 parts of demineralized water and allowed to flow through a column of 50 grams of Rohm and Haas Amberlite IR–120 in the acidic form for 25 minutes, 25 ml. of demineralized water run through the column at the same rate and collected in the same receiver. The resulting solution tested acidic to litmus. It was then allowed to run through 50 grams of Amberlite IRA–400 in the basic form in a period of about 40 minutes followed by 25 ml. of demineralized water for washing. The resulting solution tested slightly basic to litmus. The second run through the Amberlite IR–120 column followed by 25 ml. of demineralized water gave a solution weighing 400 grams which tested neutral to litmus and was found upon titration to contain no detectable quantities of either acid or base. Analysis of the solution showed that it contained 31.3% by weight of N-methylacrylamide.

Example 8

A solution of 695 parts acrylyl chloride in 2,500 parts benzene was cooled to 3° C., and 691 parts of anhydrous dimethylamine was added to the mixture during 3 hours while the mixture was thoroughly agitated and the temperature was maintained below 18° C. After dimethylamine addition was complete, the reaction mixture was filtered and the filter cake was washed twice with 200 part portions of benzene. The benzene solutions were combined, and the benzene was removed under reduced pressure after the addition of 2 g. hydroquinone. The N,N-dimethylacrylamide was distilled at 42–45° C. (1.8–2.2 mm.). The distilled product was slightly basic to litmus and was dissolved in 500 g. demineralized water. This solution was allowed to run through 50 grams of Rohm and Haas Amberlite IR–120 resin in the acidic form contained in a vertical column. Passage required about 50 min. and 25 ml. of demineralized water was then run through the column and collected in the same receiver. The resulting solution was acidic to litmus and was allowed to run through 50 grams of Rohm and Haas IRA–400 resin in the basic form during a period of about 1.5 hours followed by 25 ml. of demineralized water for washing. The resulting solution tested slightly basic to litmus, and a second run through the Amberlite IR–120 resin followed by a 25-ml. portion of demineralized water gave a solution weighing 1100 grams which tested neutral to litmus and was found upon titration to contain no detectable quantities of either acid or base. Analysis of the solution showed that it contained 47.4% by weight of N,N-dimethylacrylamide.

Example 9

To a well stirred sample of 313 g. of 94% (3 moles) concentrated sulfuric acid was added a mixture of 53 g. (1 mole) acrylonitrile and 60 g. (1 mole) isopropyl alcohol while the temperature was maintained at 50°±3° C. with strong cooling. Addition of the reactants required about 0.5 hour. The mixture was stirred 0.5 hour after addition was complete and was quenched by pouring into an ice water mixture. The mixture was partially neutralized with sodium carbonate to the sodium bisulfate stage. The crude N-isopropylacrylamide separated as an oil on the surface of this liquid and was extracted with isopropyl acetate. The isopropyl acetate was removed at about 25° C. under reduced pressure after about one gram hydroquinone had been added. The residue from the isopropyl acetate removal step was dissolved in 900 ml. demineralized water. This solution was slightly acidic to moist litmus and was allowed to flow through a column of 50 grams of Rohm and Haas Amberlite IR–120 resin in the acidic form in a vertical column during a period of 45 minutes. The column was washed with 25 ml. demineralized water and the washings and amide solution combined and allowed to flow through a vertical column of Rohm and Haas Amberlite IRA–400 resin in the basic form during a period of about 1.5 hours. The column was washed with 25 ml. of demineralized water, and the combined washings and amide solution tested slightly basic to litmus. A second run through the Amberlite IR–120 column followed by a rinse of 25 ml. demineralized water gave a solution weighing 1082 grams which tested neutral to litmus and was found upon titration to contain no detectable quantities of either acid or base. Analysis of the solution showed that it contained 9.78% by weight of N-isopropylacrylamide.

Example 10

To a solution of 309 g. of 45% aqueous methylamine containing 1 g. hydroquinone was added with stirring 200 g. of methyl methacrylate during a period of 19 minutes, while the temperature was maintained at 10–15° C. The mixture was stirred at 15–20° C. for 1 hr. 40 min. and then allowed to stand at room temperature overnight.

The above mixture was distilled at atmospheric pressure to give a forerun and a fraction boiling at 195–211° C. which was collected as crude N-methylmethacrylamide. The crude N-methylmethacrylamide was redistilled using 1% hydroquinone as inhibitor to give a product which by analysis contained 0.698 meq. acid per gram and 0.161 meq. base per gram. The distilled N-methylmethacrylamide was dissolved in 220 ml. demineralized water and was allowed to run through 50 g. of Rohm and Haas Amberlite IR–120 resin in the acidic form contained in a vertical column during a period of 25 minutes. The column was washed with 25 ml. of demineralized water and the washings were collected in the same receiver. The resulting solution tested slightly acidic to litmus and was allowed to run through 50 g. of Rohm and Haas Amberlite IRA–400 resin in the basic form in a period of about 40 minutes followed by 25 ml. demineralized water for washing. The resulting solution tested slightly basic to litmus. A second run through the Amberlite IR–120 column followed by 25 ml. of demineralized water gave a solution weighing 430 grams which tested neutral to litmus and was found upon titration to contain no detectable quantities of either acid or base. Analysis of the solution showed that it contained 33.5% by weight N-methylmethacrylamide.

Example 11

A sample of N-methylmethacrylamide was purified by distillation. A 70–30 copolymer of N-methylmethacrylamide with acrylonitrile was prepared by mixing 40 grams of distilled water with 7.0 grams of N-methylmethacrylamide and 3.0 grams of acrylonitrile in a pressure bottle which had been flushed with nitrogen. Then 0.1 gram of potassium persulfate was added. The pressure bottle was stoppered and tumbled in a water bath at 60° C. for 18 hours. The polymer was then isolated by pouring this solution into acetone and filtering the precipitated polymer. The yield was 77%, the inherent viscosity, 0.63, and the color, tan.

Subsequent preparations of these polymers under the same conditions using N-methylmethacrylamide purified by distillation resulted in yields ranging from 80% to as low as 60% and the inherent viscosities varied from 0.9 to as low as 0.5. The color ranged from tan to brown.

Another sample of N-methylmethacrylamide obtained from the same commercial source and of the same lot and batch as the first sample was purified by the ion exchange method disclosed in Example 1 and a polymer prepared using the same procedure as that used for the polymer prepared using the N-methylmethacrylamide purified by distillation. The polymer prepared from the ion exchange purified N-methylmethacrylamide was colorless. The yield of the batch was 95%, and the inherent viscosity of the polymer was 0.95.

Subsequent preparations of these polymers under the same conditions using the ion exchange purified N-methylmethacrylamide produced yields within the narrow limits of 93–95%, inherent viscosities within the narrow limits of 0.95 to 1.0, and materials which were absolutely colorless.

Purifying the monomers prior to polymerization has been found to be quite necessary in order to obtain high quality polymers. Small amounts of such acids or bases as ammonium acrylate, 3-aminopropionamide, acrylic acid, 3-aminopropionic acid and the like are normally formed as by-products in the preparation of the monomeric acrylamides and methacrylamides of this invention. The presence of even trace amounts of such impurities in a monomer can result in polymers which are off color or which cannot be satisfactorily copolymerized or graft-polymerized or which when made into fibers and dyed result in dyed fibers which are subject to rapid fading. Former methods of purification such as recrystallization and distillation have been unsatisfactory due to incomplete removal of these impurities. However, the use of ion exchange resins for purification of water solutions of these monomeric acrylamides was entirely unexpected, and it was completely unforeseen that a monomeric product of such high purity would be obtained. It was also most unexpected that the use of ion exchange resins for the purification of acrylamides would result in monomers having higher purity or better polymerizability than monomers purified by the conventional methods.

By acrylamides as used herein are meant compounds having the general formula

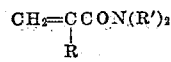

where R is methyl or hydrogen and R' is hydrogen or an alkyl radical sufficiently low in the homologous series to render the acrylamide water-soluble. Some examples of these water-soluble acrylamides are acrylamide, methacrylamide, N-methylmethacrylamide, N,N-dimethylacrylamide, N-ethylacrylamide and N-isopropylacrylamide.

This application is a continuation-in-part of U. S. patent application Serial No. 318,327, filed November 1, 1952, now abandoned.

We claim:

1. A process of purifying an aqueous solution of a composition having the general formula:

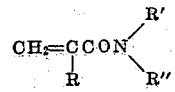

where R is selected from the group of methyl and hydrogen and R' and R'' are selected from the group consisting of hydrogen and lower alkyl, comprising contacting the solution with a cation exchange resin which is activated in the acidic form and with an anion exchange resin which is activated in the basic form.

2. A process for treating an aqueous solution of water-soluble lower alkyl substituted acrylamides to remove the impurities consisting essentially of organic and inorganic acids, bases and salts thereof comprising treating the solution with a cation exchange resin which is in the acidic form, separating the solution from the resin, treating the solution with an anion exchange resin which is in the basic form, and separating the solution from the resin.

3. A process for separating impurities from water-soluble lower alkyl substituted acrylamides comprising treating an aqueous solution of the crude acrylamide with a cation exchange resin which is in the acidic form below about 90° C. and with an anion exchange resin in the basic form below about 55° C.

4. In a process for purification of water soluble lower alkyl substituted acrylamides in which the acrylamides are purified by filtration and by distillation, the step of further purifying the acrylamides comprising dissolving the acrylamides in water and passing the acrylamide solution through a cationic exchange resin which is in the acidic form, passing demineralized water through the column and combining this water with the treated acrylamide solution, passing the solution through an anion exchange resin in the basic form, and washing the resin with demineralized water.

References Cited in the file of this patent
UNITED STATES PATENTS

| 2,413,844 | Rawlings | Jan. 7, 1947 |
| 2,580,325 | Scott | Jan. 1, 1952 |
| 2,734,915 | Jones | Feb. 14, 1956 |

OTHER REFERENCES

Nachod: Ion Exchange (1949), Academic Press, pages 363–382.

Rohm and Haas Co. (Phila., Pa.), Laboratory Manual Amberlite IRA 410–4.

Rohm and Haas Co. (Phila., Pa.), Laboratory Manual IR–100–7.